(12) United States Patent
Walters et al.

(10) Patent No.: US 11,477,414 B2
(45) Date of Patent: *Oct. 18, 2022

(54) SYSTEMS AND METHODS FOR REDUCING VIDEO CONFERENCE BANDWIDTH NEEDS

(71) Applicant: Capital One Services, LLC, McLean, VA (US)

(72) Inventors: Austin Walters, Savoy, IL (US); Anh Truong, Champaign, IL (US); Jeremy Edward Goodsitt, Champaign, IL (US); Vincent Pham, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,286

(22) Filed: Jun. 7, 2021

(65) Prior Publication Data

US 2022/0038658 A1 Feb. 3, 2022

Related U.S. Application Data

(63) Continuation of application No. 16/941,866, filed on Jul. 29, 2020, now Pat. No. 11,032,516.

(51) Int. Cl.
*H04N 7/15* (2006.01)
*G06V 40/16* (2022.01)

(52) U.S. Cl.
CPC ............. *H04N 7/15* (2013.01); *G06V 40/161* (2022.01); *G06V 40/174* (2022.01)

(58) Field of Classification Search
CPC ......... H04N 7/15; G06K 9/00; G06K 9/00248

(Continued)

(56) References Cited

U.S. PATENT DOCUMENTS

| | | | | |
|---|---|---|---|---|
| 5,982,415 A | * | 11/1999 | Sakata | ...................... H04N 7/15 348/14.11 |
| 9,560,315 B1 | | 1/2017 | Silberman et al. | |

(Continued)

OTHER PUBLICATIONS

Essa, I. et al., "Coding, Analysis, Interpretation, and Recognition of Facial Expressions," 19 IEEE Transactions on Pattern Analysis and Machine Intelligence 7 (Jul. 1997).

(Continued)

*Primary Examiner* — Melur Ramakrishnaiah
(74) *Attorney, Agent, or Firm* — Troutman Pepper Hamilton Sanders LLP; Christopher J. Forstner; John A. Morrissett

(57) ABSTRACT

The disclosed systems and methods may receive a request to set up a video conference between a first account associated with a first person and a second account associated with a second person, retrieve a stored first representation of a first face of the first person and a stored second representation of a second face of the second person based on the request, initiate the video conference between a first user device associated with the first person and a second user device associated with the second person, receive facial expressions of the first person from the first user device, encode the facial expressions of the first person to generate first encoded facial expressions, and transmit the first encoded facial expressions of the first person to the second user device to be decoded and combined with the stored first representation of the first face.

20 Claims, 7 Drawing Sheets

(58) Field of Classification Search
USPC .......................................... 348/14.01–14.16
See application file for complete search history.

(56) References Cited

U.S. PATENT DOCUMENTS

| | | | |
|---|---|---|---|
| 10,516,851 B1 | 12/2019 | Eirinberg et al. | |
| 2002/0164068 A1 | 11/2002 | Yan | |
| 2003/0234859 A1 | 12/2003 | Malzbender et al. | |
| 2010/0201780 A1* | 8/2010 | Bennett | H04N 7/15 348/14.12 |
| 2014/0247318 A1* | 9/2014 | Tucker | H04N 7/147 348/14.05 |
| 2016/0353056 A1* | 12/2016 | Cullen | H04N 7/147 |
| 2018/0103074 A1 | 4/2018 | Rosenberg | |
| 2019/0340419 A1 | 11/2019 | Milman et al. | |
| 2019/0378316 A1 | 12/2019 | Hushchyn et al. | |
| 2020/0358983 A1* | 11/2020 | Astarabadi | G06T 15/04 |

OTHER PUBLICATIONS

Shorten, Connor, "Auto-encoders for Data Compression," Noteworthy—The Journal Blog (https://blog.usejournal.com/auto-encoders-for-data-compression-73ea0724e90b) (Jul. 17, 2018).

Chen, X. et al., "Variation Lossy Autoencoder," ICLR 2017 (Mar. 4, 2017).

https://www.virtuix.com (2020) (Last accessed Jun. 22, 2020).

Gao, P. et al., "3D Model Reconstruction from Video Recorded with a Compact Camera," 2012 9th International Conference on Fuzzy Systems and Knowledge Discovery (2012).

Delis, P. et al., "Point Cloud Derived From Video Frames: Accuracy Assessment in Relation to Terrestrial Laser Scanning and Digital Camera Data," The International Archives of the Photogrammetry, Remote Sensing and Spatial Information Sciences, vol. XLII-2/W3, 2017, 3D Virtual Reconstruction and Visualization of Complex Architectures Mar. 1-3, 2017.

* cited by examiner

SYSTEMS AND METHODS FOR REDUCING VIDEO CONFERENCE BANDWIDTH NEEDS

CROSS REFERENCE TO RELATED APPLICATIONS

This application is a continuation of, and claims priority under 35 U.S.C. § 120 to, U.S. patent application Ser. No. 16/941,866, filed Jul. 29, 2020, which will issue as U.S. Pat. No. 11,032,516 on Jun. 8, 2021, the entire contents of which is fully incorporated herein by reference.

FIELD OF INVENTION

The present disclosure relates to reducing video conference bandwidth needs by capturing or receiving facial expressions of a speaker and transmitting those facial expressions to participants to be applied to a representation of the speaker's face instead of a video of the speaker's face.

BACKGROUND

Video conference systems are important tools for business and personal use. They facilitate "face-to-face" meetings without requiring one or more participants to travel to another local. However, these video conferences require heavy bandwidth requirements (e.g., 1-2 Mbps) for each participant device. And increasing the number of participant devices connected to a video conference or the quality of video being captured and transmitted further increases the bandwidth required of each of the participant devices. When a participant device of a video conference does not meet the required bandwidth needs, it may fail to receive clear video or audio. In some cases, transmission of the video or audio may fail entirely. Similarly, when a presenter device of a video conference does not meet the required bandwidth needs, the participant devices may not receive clear (or any) video or audio. Put another way, a presenter device or a participant device with low bandwidth may interfere or compromise the video conference.

Accordingly, there is a need for improved systems and methods to reduce bandwidth needs for video conferencing. Embodiments of the present disclosure are directed to this and other considerations.

SUMMARY

Disclosed embodiments provide systems and methods for reducing video conference bandwidth needs by capturing or receiving facial expressions of a speaker and transmitting those facial expressions to participants to be applied to a representation of the speaker's face instead of a video of the speaker's face.

The system may include one or more processors and a memory in communication with the one or more processors and storing instructions that when executed by the one or more processors, are configured to cause the system to perform steps of a method. The method may include receiving a video including a first face of a first person, generating, using a variational auto-encoder, a first 3D representation of the first face by analyzing the video, and store the first 3D representation of the first face in a database. The method may also include receiving a request to set up a video conference between the first person and a second person, retrieving the first 3D representation of the first face and a second 3D representation of a second face of the second person based on the request to conference, and initiating the video conference between a first user device associated with the first person and a second user device associated with the second person. The method may also include automatically identifying the first user device or the second user device as a speaker device associated with a speaker. The speaker may be the first person or the second person. The method may also include automatically identifying the first user device or the second user device as a listening device, associated with a listener, when not identified as the speaker device. The listener may be the first person or the second person. The method may also include receive facial expressions of the speaker from the speaker device, encode the facial expressions of the speaker to generate encoded facial expressions, and transmit the encoded facial expressions of the speaker to the listening device to be decoded and combined with the first 3D representation of the first face or the second 3D representation of the second face associated with the speaker.

The system may include one or more processors and a memory in communication with the one or more processors and storing instructions that when executed by the one or more processors, are configured to cause the system to perform steps of a method. The method may include receiving a video including a first face of a first person, generating, using a variational auto-encoder, a first representation of the first face based on the video, storing the first representation of the first face in a database. The method may also include receiving a request to initiate a video conference between a first user device associated with the first person and a second user device associated with a second person. The method may include retrieving based on the request, the first representation of the first face and a second representation of a second face from the database, initiating the video conference between the first user device and the second user device, and selecting the first user device or the second user device as a presenter device associated with a presenter. The presenter may be the first person or the second person. The method may also include selecting the first user device or the second user device as an attendee device associated with an attendee when not identified as the presenter device. The attendee may be the first person or the second person. The method may also include receiving a live video stream of the presenter, identifying and extracting facial expressions of the presenter from the live video stream, encoding the facial expressions of the presenter to generate encoded facial expressions, and transmit the encoded facial expressions of the presenter to the attendee device to be decoded and combined with the first representation of the first face or the second representation of the second face associated with the presenter device.

The system may include one or more processors and a memory in communication with the one or more processors and storing instructions that when executed by the one or more processors, are configured to cause the system to perform steps of a method. The method may include receiving a request to set up a video conference between a first account associated with a first person and a second account associated with a second person, retrieving a stored first representation of a first face of the first person and a stored second representation of a second face of the second person based on the request, initiating the video conference between a first user device associated with the first person and a second user device associated with the second person. The method also includes receiving facial expressions of the first person from the first user device, encoding the facial expressions of the first person to generate first encoded facial expressions; and transmitting the first encoded facial expressions of the first person to the second user device to be decoded and combined with the stored first representation of the first face.

Further features of the disclosed systems, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
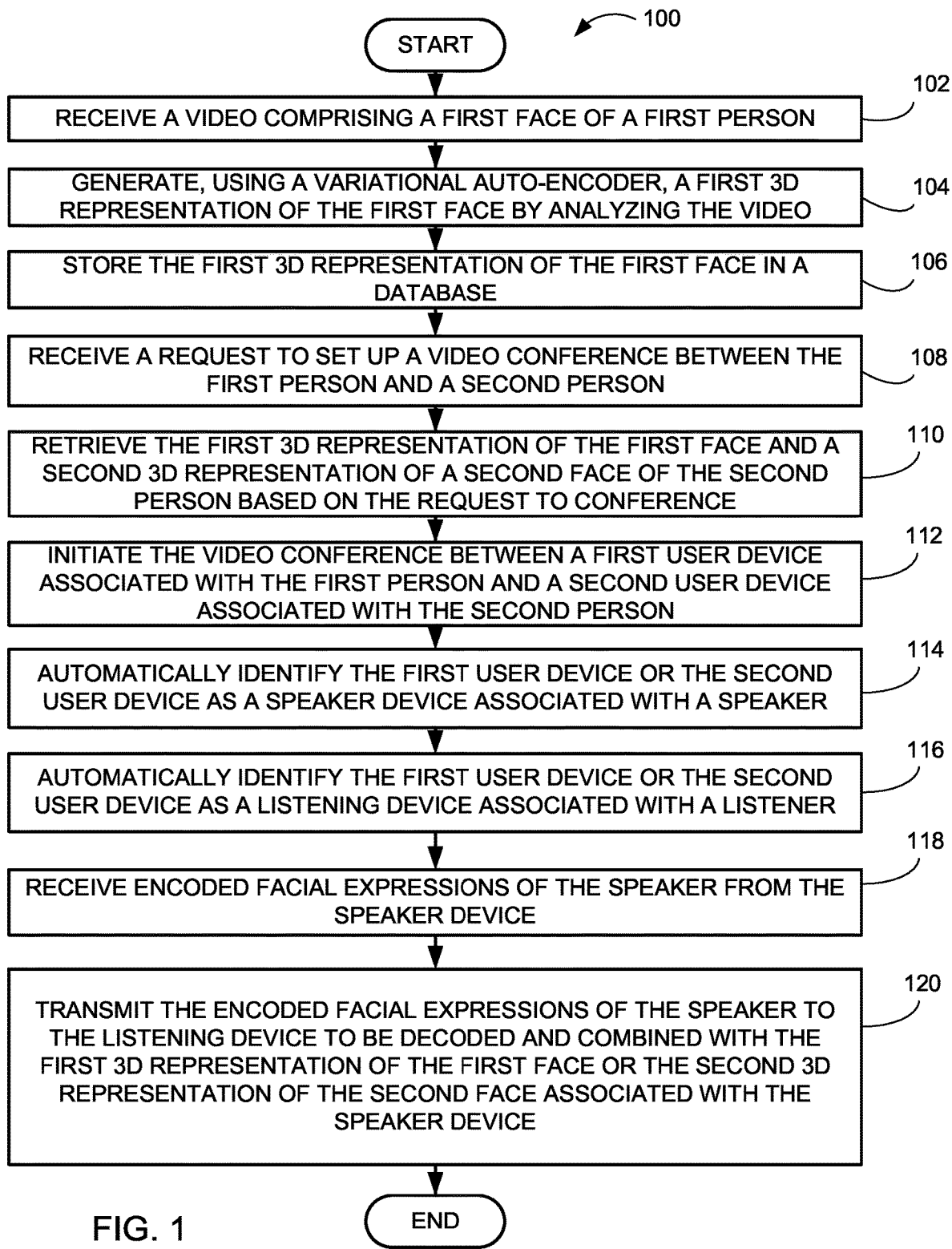
FIG. 1 is a flowchart of an exemplary method for generating and using 3D facial representations with transmittable facial expressions in a video conference.

FIG. 1 is a flowchart of an exemplary method 100 for generating and using 3D facial representations with transmittable facial expressions in a video conference. Method 100 may be performed by a conference system 708 (e.g., a video conference system 620 and/or some or all of the devices and systems within a system 700 described in more detail with respect to FIGS. 6 and 7 below).

In block 102, a conference system 708 may receive a video comprising a first face of a first person. The conference system 708 may receive the video from a first user device or from another device (e.g., a cloud server). The conference system 708 may receive the video as a part of a registration of a new user with the conference system 708. The video may include at least two frames. In some embodiments, the conference system 708, may receive a plurality of images of a first face instead of the video.

The conference system 708 may determine whether a portion of the first face is present in the video. When the conference system 708 determines that a portion of the first face is not present in the video, the conference system 708 may transmit a request for a replacement video to the first user device. When the conference system 708 determines that a portion of the first face is present in the video, the conference system 708 may generate a first 3D representation of the first face by analyzing the video in block 104.

In block 104, the conference system 708 may generate a first 3D representation of the first face by analyzing the video. This may be done by generating a point cloud of the first face from the video. Generating the point cloud may include using simultaneous multi image correlation methods. Simultaneous multi image correlation methods include, among others, a multiphoto geometrically constrained (MPGC) method, a semi global matching (SGM) method. These methods are advantageous because a given point does not have to be present on every frame of the video of in every image in a plurality of images.

In block 106, the conference system 708 may store the first 3D representation of the first face in a database (e.g., database 716, database 724, and/or database 660) or memory (e.g., memory 630).

In block 108, the conference system 708 may receive a request to set up a video conference between the first person and a second person. For example, the first person associated with the first user device 702A may open an application running on the first user device 702A or navigate to a webpage associated with the conference system 708 and enter the second person's contact information (e.g., email or phone number) and press a button (e.g., "request video conference") causing the first user device to transmit (e.g., submit) the request including the second person's contact information to the conference system 708. The request to set up the video conference may include a list of invitees comprising the second person, a date for the video conference, and a start time for the video conference.

In block 110, the conference system 708 may retrieve the first 3D representation of the first face and a second 3D representation of a second face of the second person based on the request to conference. The first 3D representation and the second 3D representation may be retrieved from the database (e.g., database 716, database 724, and/or database 660). The database may be a remote database.

In block 112, the conference system 708 may initiate the video conference between a first user device associated with the first person and a second user device associated with the second person. The conference system 708 may initiate the video conference at a schedule date and time regardless of whether the first person and/or the second person has joined the video conference. The conference system 708 may wait to initiate the video conference until the first person and/or the second person joined the video conference. A person has joined the video conference when they have clicked a link (with an active internet connection), which was generated and distributed to the conference participants by the conference system 708 ahead of the video conference. Alternatively, a person has joined the video conference when they have entered a meeting number (generated and distributed to the conference participants by the conference system 708 ahead of the video conference) into a software application running on the person's computer, mobile device, etc., or on a website associated with the conference system 708.

The conference system 708 may also transmit the first 3D representation of the first face to the second user device (e.g., user device 702B) prior to or along with initiating the video conference. Similarly, the conference system 708 may also transmit the second 3D representation of the second face to the first user device (e.g., user device 702A) prior to or along with initiating the video conference.

In block 114, the conference system 708 may automatically identify the first user device or the second user device as a speaker device associated with a presenter or speaker. The speaker or presenter may be the first person or the second person. The conference system 708 may identify the speaker device in a number of ways. Some of these ways are described below.

In one case, the conference system 708 may receive audio from one participant device (e.g., a first user device 702A associated with the first person) and not the other(s) (e.g., a second user device 702B associated with the second person) during a video conference. When this happens, the conference system 708 may identify the first user device 702A associated with the first person as the speaker device. If no audio is received by the conference system 708, the conference system may default to identifying or selecting the user device (e.g., the first user device 702A) associated with the request to set up or schedule the video conference. As another option, the conference system 708 may receive a default speaker designation along with the request to schedule or set up the video conference. Based on the default speaker designation, the conference system 708 identifies or selects a particular user device (e.g., the first user device 702A) associated with the request to set up or schedule the video conference when the conference system does not receive audio from any user device participating in the video conference (e.g., the first user device 702A and the second user device 702B). Similarly, the conference system 708 may receive a default speaker designation (or a change in the default speaker designation) designating a particular user device (e.g., the second user device 702B) during the video conference. Based on the default speaker designation or change in the default speaker designation during the video conference, the conference system 708 may identify or select the currently designated user device (e.g., the second user device 702B) as the speaker device when the conference system 708 receives no audio from any user device participating in the video conference (e.g., the first user device 702A and the second user device 702B).

In another case, the conference system 708 may receive audio from more than one participant device (e.g., a first audio from a first user device 702A associated with the first person and the second user device 702B associated with the second person) during a video conference. The conference system 708 may determine which among the first audio and the second audio has a highest audio level (e.g., loudest). The conference system 708 may identify or select the first user device 702A as the speaker device when the first audio (associated with the first user device 702A) has the highest audio level or identify or select the second user device 702B as the speaker device when the second audio (associated with the second user device 702B) has the highest audio level. As described above, the conference system 708 may default to identifying or selecting the user device associated with the request to set up or schedule the video conference or may receive and use a default speaker designation to identify or select a speaker device when the conference system 708 receives no audio from any user device participating in the video conference (e.g., the first user device 702A and the second user device 702B).

In block 116, the conference system 708 may automatically identify the first user device or the second user device as a listening device, associated with a listener, when not identified as the speaker device. The listener is the first person or the second person. The conference system 708 may identify or select only one user device (e.g., first user device 702A) as the speaker device. Once this is determined by the conference system 708, the conference system 708 identifies the remaining user device(s) (e.g., second user device 702B) as the listening device(s).

In block 118, the conference system 708 may receive encoded facial expressions of the speaker from the speaker device. The speaker device (e.g., the first user device 702A or the second user device 702B) may capture a live video of the user's face from which it may extracts facial expressions. The facial expressions may be extracted using a neural network (e.g. a variational autoencoder) trained to recognize facial expressions. The conference system 708 may also request facial expressions from the speaker device prior to receiving the facial expressions from the speaker device.

The encoded facial expressions are more efficiently transmitted than raw data associated with the facial expressions. Typically, the encoded facial expressions are several orders of magnitude smaller than the raw facial expressions.

The variational autoencoder of the speaker device may be trained by giving the variational auto encoder an image or video and instructing it to deconstruct the image or video to a smaller space, then try to reconstruct the image or video. The reconstructed image or video is then compared against the original image or video and the results are fed back into the variational autoencoder. Eventually, this loop will stabilize creating an image or video as close to the original as possible (given the latent space). The latent space is where the facial expressions are described. The variational autoencoder encodes the facial expressions to the latent space, then a variational autoencoder (decoder) reads the encoded facial expressions from the latent space and decodes the image or video.

In block 120, the conference system 708 may transmit the encoded facial expressions of the speaker to the listening device to be decoded and combined with the first 3D representation of the first face or the second 3D representation of the second face associated with the speaker. For example, the conference system 708 may send the encoded facial expressions over the network 706.

The conference system 708 may perform steps 114-122 in approximately real-time. For example, there may be a delay on the order of milliseconds, 60 hz=16.66 ms between frames. Though the actual delay will depend on the hardware involved on the user side and the conference system 708 side.

As described above, the conference system 708 may request facial expressions from the speaker device prior to receiving the facial expressions from the speaker device. In another example, the conference system 708 may receive a request from the first user device 702A and/or the second user device 702B for a reduced bandwidth experience prior to requesting facial expressions from the speaker device. The conference system 708 may determine whether the conference system 708 has received a request for reduced bandwidth experience from the listening device (e.g., the first user device 702A or the second user device 702B). If the conference system 708 determines that it has received a request for reduced bandwidth experience, then it may request facial expressions from the speaker device prior to receiving the facial expressions from the speaker device, receive facial expressions of the speaker from the speaker device (block 118), encode the facial expressions of the speaker to generate encoded facial expressions (block 120), and transmit the encoded facial expressions of the speaker to the listening device (block 122). However, if the conference system 708 determines that the conference system 708 has not received a request for reduced bandwidth experience from the listening device, then the conference system 708 may request video from the speaker device, receive video from the speaker device, optionally encode the video, and transmit the video (or encoded video) to the listening device. In some examples, the conference system 708 must receive no requests for a reduced bandwidth experience (e.g., transmitting and receiving facial expressions instead of raw video) before it requests, receives, (optionally encodes), and/or transmits video in place of facial expressions. In other words, the reduced bandwidth experience may be the default experience.

In other examples, the video conference system 708 may receive a first bandwidth indication from the first user device 702A and a second bandwidth indication from the second user device 702B. The video conference system 708 may determine whether the first bandwidth indication or the second bandwidth indication is below a predetermined threshold. If the first bandwidth indication or the second bandwidth indication is below the predetermined threshold (e.g., a 1 Mb threshold), then the video conference system 708 may request facial expressions from the speaker device prior to receiving the facial expressions from the speaker device, receive facial expressions of the speaker from the speaker device (block 118), encode the facial expressions of the speaker to generate encoded facial expressions (block 120), and transmit the encoded facial expressions of the speaker to the listening device (block 122). If the first bandwidth indication and the second bandwidth indication are each equal to or greater then the predetermined threshold, then the conference system 708 may request video from the speaker device, receive video from the speaker device, optionally encode the video, and transmit the video (or encoded video) to the listening device. In some examples, the conference system 708 must receive a request for reduced bandwidth experience from all participants (or a majority) of the video conference before it requests, receives, (optionally encodes), and transmits video in place of facial expressions.

Figure 2:
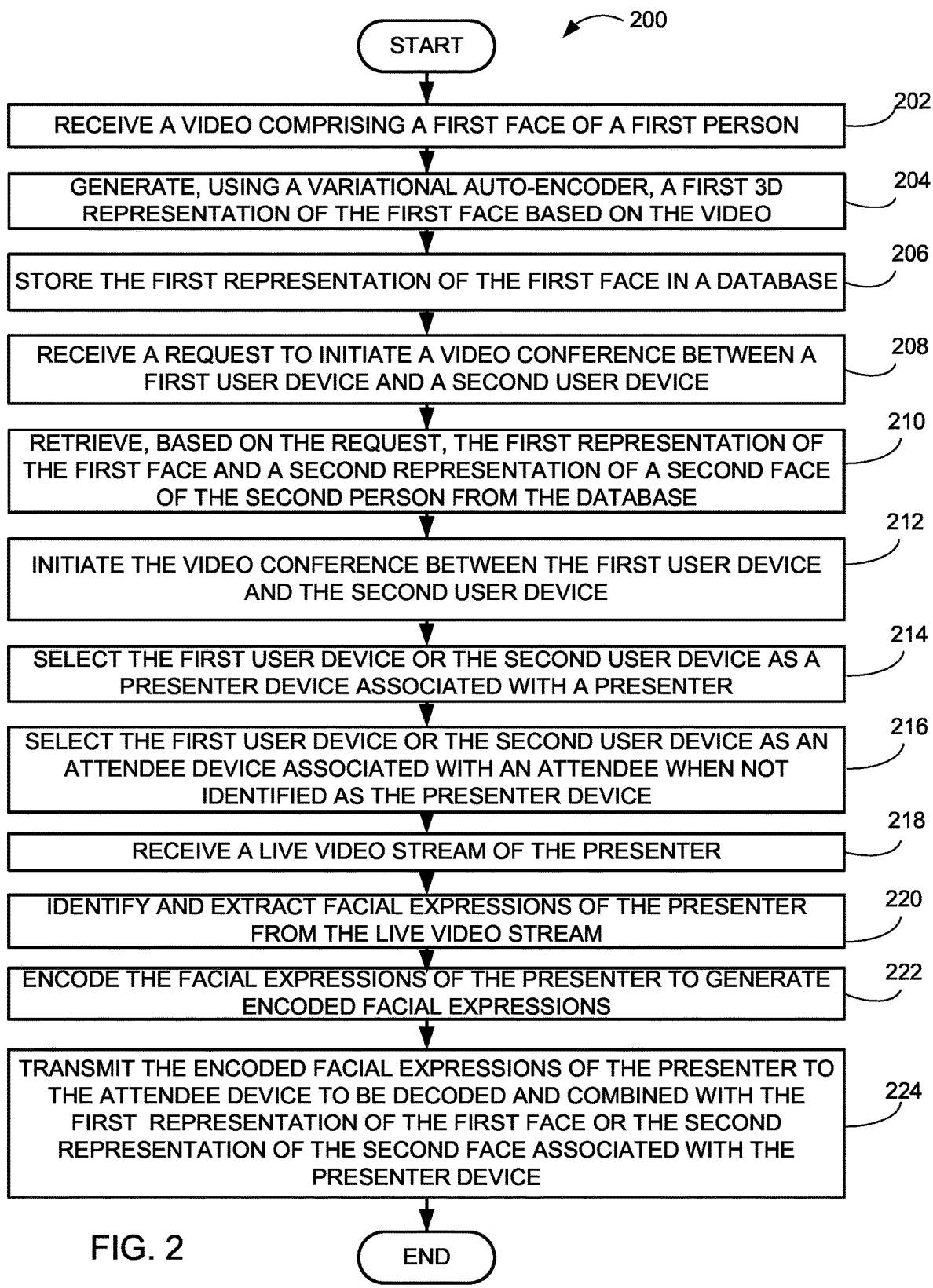
FIG. 2 is a flowchart of another exemplary method for using facial representations and capturing and using facial expressions in a video conference.

FIG. 2 is a flowchart of another exemplary method for using facial representations and extracting and using facial expressions in a video conference. Method 200 may be performed by a conference system 708 (e.g., a video conference system 620 and/or some or all of the devices and systems within a system 700 described in more detail with respect to FIGS. 6 and 7 below). Method 200 is similar to method 100 except that method 200 included receiving a live video stream from the speaker and identifying facial expressions from the live video instead of simply receiving the facial expressions as in method 100. The descriptions associated with blocks 102, 104, 106, 108, 110, 112, 114, 116, and 120 of method 100 are referenced and incorporated as the respective descriptions for blocks 202, 204, 206, 208, 210, 212, 214, 216, and 224 of method 200 except that the term "speaker" is replaced with "presenter" and the term "listener" is replaced with "attendee." Thus, the description for blocks 202, 204, 206, 208, 210, 212, 214, 216, 222, and 224 will be omitted below for brevity.

In block 218, the conference system 708 may receive a live video stream of the presenter. For example, the first user device 702A may be selected as the presenter device in which case the first user device 702A may transmit a live video stream over the network 706 to the conference system 708.

In block 220, the conference system 708 may identify and extract facial expressions of the presenter from the live video stream. The facial expressions may be extracted using a neural network (e.g. a variational autoencoder) trained to recognize facial expressions.

In another example, the conference system 708 may receive a request from the first user device 702A and/or the second user device 702B for a reduced bandwidth experience prior to requesting facial expressions from the presenter device. The conference system 708 may determine whether the conference system 708 has received a request for reduced bandwidth experience from the attendee device (e.g., the first user device 702A or the second user device 702B). If the conference system 708 determines that it has received a request for reduced bandwidth experience, then it may identify and extract facial expressions from the received live video stream (block 220), encode the facial expressions of the presenter to generate encoded facial expressions (block 222), and transmit the encoded facial expressions of the presenter to the presenter device (block 224). However, if the conference system 708 determines that the conference system 708 has not received a request for reduced bandwidth experience from the attendee device, then the conference system 708 may optionally encode the received live video stream video, and transmit the live video stream (or encoded video) to the attendee device.

In other examples, the video conference system 708 may receive a first bandwidth indication from the first user device 702A and a second bandwidth indication from the second user device 702B. The video conference system 708 may determine whether the first bandwidth indication or the second bandwidth indication is below a predetermined threshold. If the first bandwidth indication or the second bandwidth indication is below the predetermined threshold, then the video conference system 708 may identify and extract facial expressions from the received live video stream (block 220), encode the facial expressions of the presenter to generate encoded facial expressions (block 222), and transmit the encoded facial expressions of the presenter to the presenter device (block 224). If the first bandwidth indication and the second bandwidth indication are each equal to or greater than the predetermined threshold, then the conference system 708 may optionally encode the received live video stream video, and transmit the live video stream (or encoded video) to the attendee device.

Figure 3:
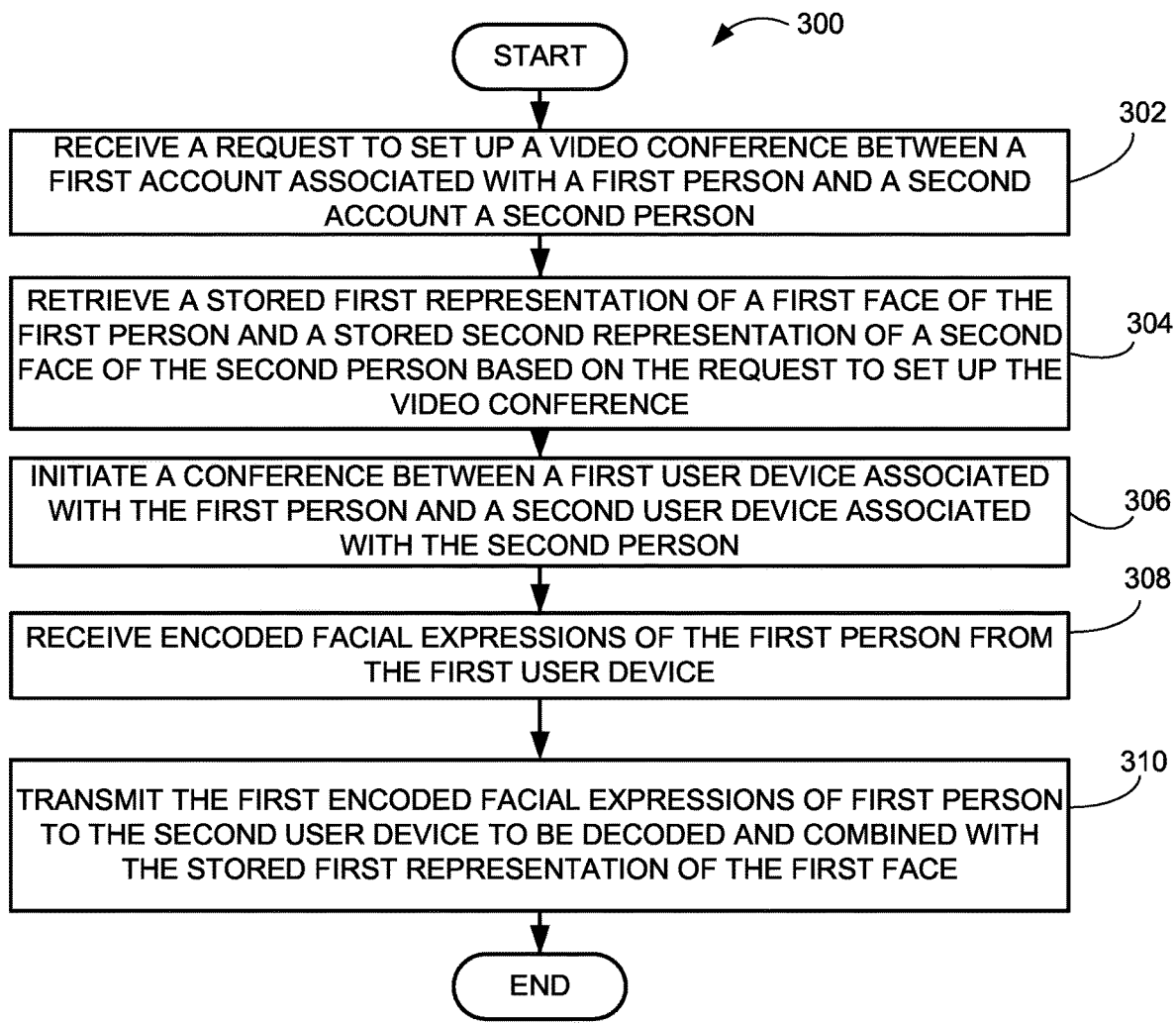
FIG. 3 is a flowchart of a further exemplary method for using stored facial representations with transmittable facial expressions in a video conference.

FIG. 3 is a flowchart of a further exemplary method for using stored facial representations with transmittable facial expressions in a video conference. Method 300 may be performed by a conference system 708 (e.g., a video conference system 620 and/or some or all of the devices and systems within a system 700 described in more detail with respect to FIGS. 6 and 7 below). Method 300 is similar to method 100 except that method 300 does not explicitly include registration steps (blocks 102, 104, and 106) or steps identifying a speaker device or listening device (blocks 114 and 116) and method 300 replaces the "3D representation" with simply "representation." Thus, the descriptions associated with blocks 108, 110, 112, 118, and 120 of method 100 are referenced and incorporated as the respective descriptions for blocks 302, 304, 306, 308, and 310 of method 300 except that the term "speaker" is replaced with "presenter" and the term "listener" is replaced with "attendee." Accordingly, the descriptions for blocks 302, 304, 306, 308, and 310 will be omitted below for brevity.

Figure 4:
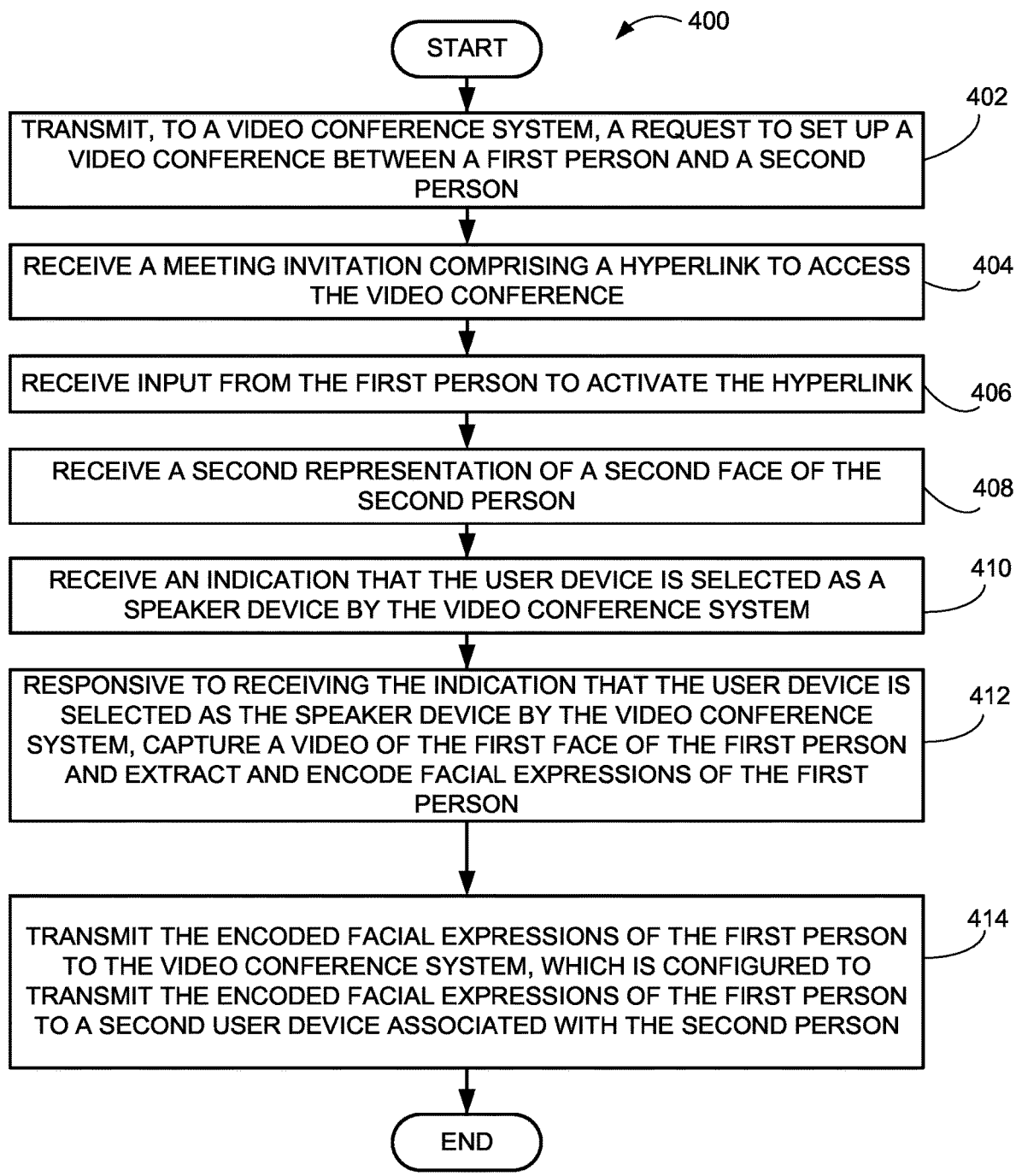
FIG. 4. is a flowchart of an additional exemplary method of a speaker device for requesting a video conference and capturing and transmitting facial expressions to a video conference system during the video conference.

FIG. 4. is a flowchart of an additional exemplary method of a speaker device for requesting a video conference and extracting and transmitting facial expressions to a video conference system during the video conference. Method 400 may be performed by a user device (e.g., first user device 702A).

In block 402, the first user device 702A may transmit a request to set up a video conference between a first person and a second person. In block 404, the first user device 702A may receive a meeting invitation including a hyperlink to access the video conference. In block 406, the first user device 702A may receive input from the first person to activate the hyperlink. In block 408, the first user device 702A may receive a second representation of a second face of the second person. In block 410, the first user device 702A may receive an indication that the first user device 702A is selected as a speaker device by the video conference system 620.

In block 412, the first user device 702A may capture a video of the first face of the first person and extract and encode facial expressions of the first person in response to receiving the indication that the user device is selected as the speaker device by the video conference system 620. The facial expressions may be extracted and encoded using a neural network (e.g. a variational autoencoder) trained to recognize facial expressions. The neural network may reside within a software application previously downloaded to the first user device 702A.

In block 414, the first user device 702A may transmit the facial expressions of the first person to the video conference system 620. The video conference system 620 is configured to encode the facial expressions of the first person and transmit the encoded facial expressions of the first person to a second user device 702B. The first user device 702A may transmit the facial expressions over the network 706.

Figure 5:
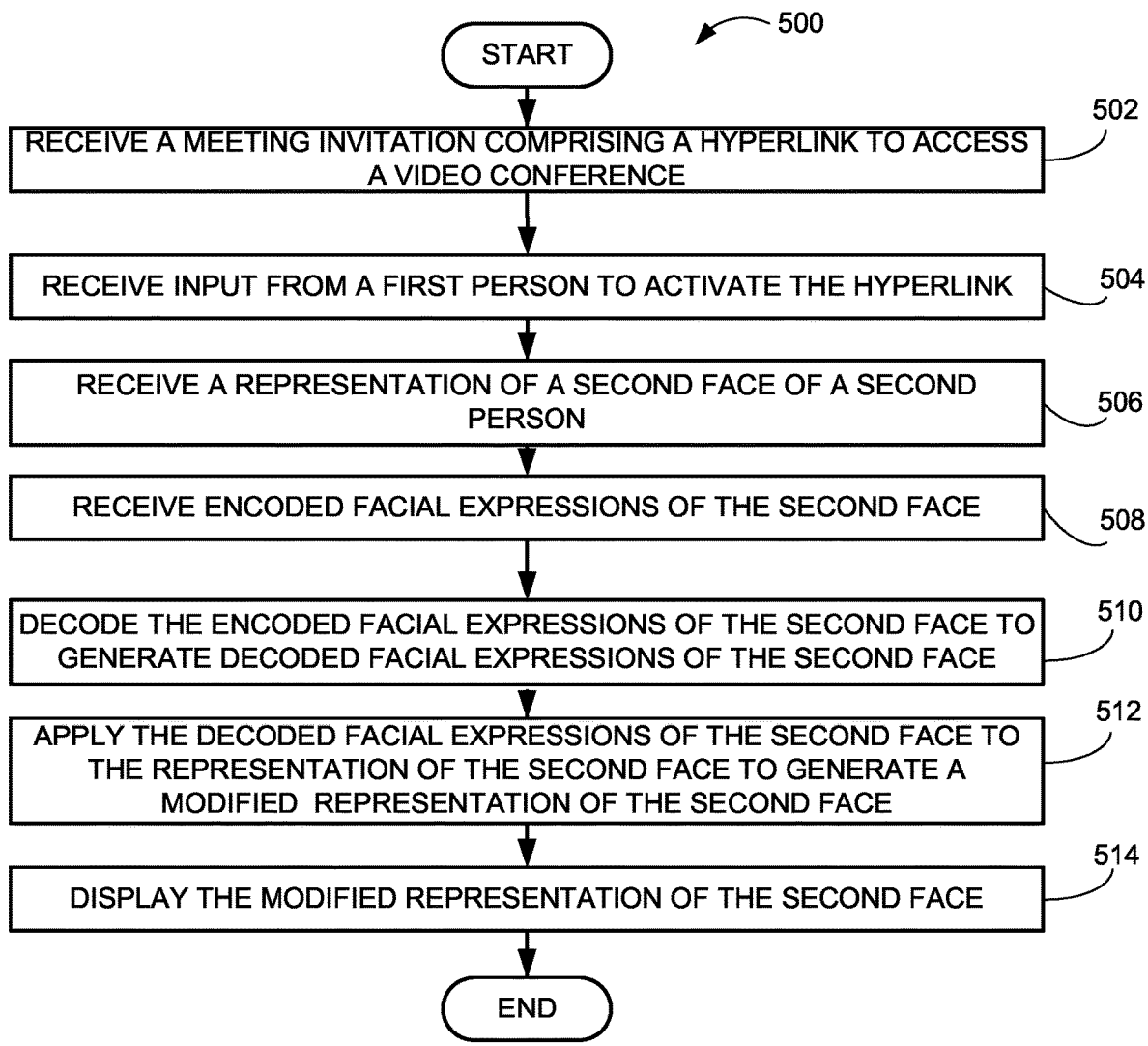
FIG. 5 is a flowchart of yet another exemplary method of a listening device for applying facial expressions to a representation of a face and displaying the facial expressions and the representation of the face.

FIG. 5 is a flowchart of yet another exemplary method of a listening device for applying facial expressions to a representation of a face and displaying the facial expressions and the representation of the face. Method 400 may be performed by a user device (e.g., first user device 702A).

In block 502, the first user device 702A may receive a meeting invitation including a hyperlink to access a video conference. In block 504, the first user device 702A may receive input from a first person to activate the hyperlink. In block 506, the first user device 702A may receive a representation of a second face of a second person. In block 508, the first user device 702A may receive encoded facial expressions of the second face. The first user device 702A may receive the encoded facial expressions over the network 706. In block 510, the first user device 702A may decode the encoded facial expressions of the second face to generate decoded facial expressions of the second face. In block 512, the first user device 702A may apply the decoded facial expressions of the second face to the representation of the second face to generate a modified representation of the second face. In block 514, the first user device 702A may display the modified representation of the second face.

Figure 6:
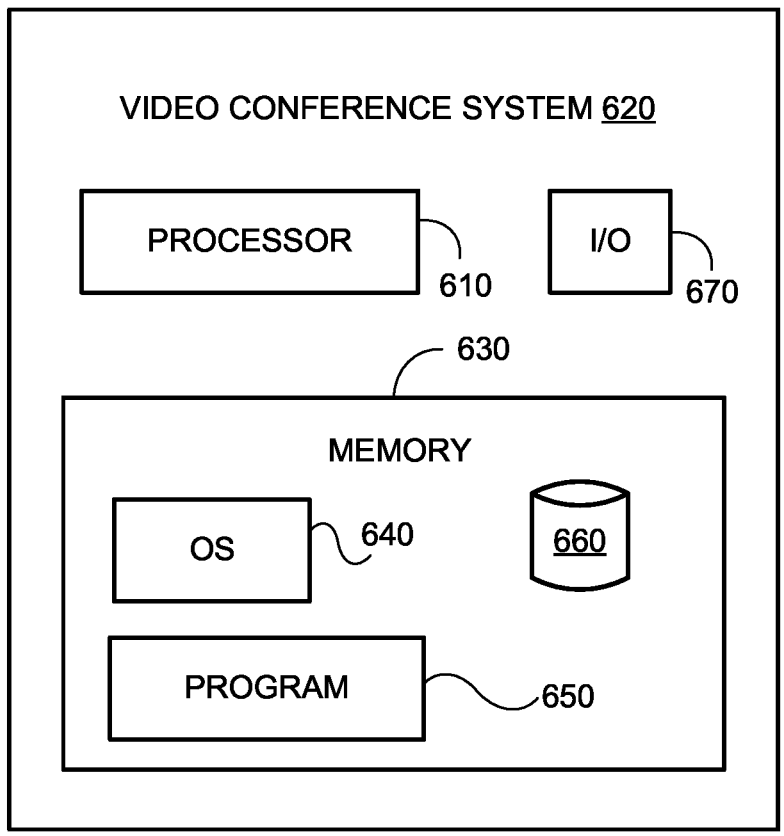
FIG. 6 is a component diagram of an example video conference system.

FIG. 6 is a component diagram of an example video conference system 620.

As shown, video conference system 620 may include a processor 610, an input/output ("I/O") device 670, a memory 630 containing an operating system ("OS") 640, a program 650 and database 660. For example, video conference system 620 may be a single device (e.g., server) or may be configured as a distributed computer system including multiple servers, devices, or computers that interoperate to perform one or more of the processes and functionalities associated with the disclosed embodiments. In some embodiments, video conference system 620 may further include a peripheral interface, a transceiver, a mobile network interface in communication with the processor 610, a bus configured to facilitate communication between the various components of video conference system 620, and a power source configured to power one or more components of video conference system 620.

A peripheral interface (not shown) may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver (not shown) may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface (not shown) may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to components requiring power.

Processor 610 may include one or more of a microprocessor, microcontroller, digital signal processor, co-processor or the like or combinations thereof capable of executing stored instructions and operating upon stored data. Memory 630 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 630.

Processor 610 may be one or more known processing devices, such as a microprocessor from the Pentium™ family manufactured by Intel™ or the Turion™ family manufactured by AMD™. Processor 610 may constitute a single core or multiple core processor that executes parallel processes simultaneously. For example, processor 610 may be a single core processor that is configured with virtual processing technologies. In certain embodiments, processor 610 may use logical processors to simultaneously execute and control multiple processes. Processor 610 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Video conference system 620 may include one or more storage devices configured to store information used by processor 610 (or other components) to perform certain functions related to the disclosed embodiments. In some embodiments, video conference system 620 may include memory 630 that includes instructions to enable processor 610 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, video conference system 620 may include memory 630 that includes instructions that, when executed by processor 610, perform one or more processes consistent with the functionalities disclosed herein. Methods, systems, and articles of manufacture consistent with disclosed embodiments are not limited to separate programs or computers configured to perform dedicated tasks. For example, video conference system 620 may include memory 630 that may include one or more programs 650 to perform one or more functions of the disclosed embodiments. Moreover, processor 610 may execute one or more programs 650 located remotely from conference system 708 (see FIG. 7). For example, conference system 708 may access one or more remote programs 650, that, when executed, perform functions related to disclosed embodiments.

Memory 630 may include one or more memory devices that store data and instructions used to perform one or more features of the disclosed embodiments. Memory 630 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 630 may include software components that, when executed by processor 610, perform one or more processes consistent with the disclosed embodiments. In some embodiments, memory 630 may include a database 660 for storing related data to enable authentication system 620 to perform one or more of the processes and functionalities associated with the disclosed embodiments.

Video conference system 620 may also be communicatively connected to one or more memory devices (e.g., databases) locally or through a network. The remote memory devices may be configured to store information and may be accessed and/or managed by video conference system 620. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Video conference system 620 may also include one or more I/O devices 670 that may comprise one or more interfaces for receiving signals or input from devices and providing signals or output to one or more devices that allow data to be received and/or transmitted by authentication system 620. For example, video conference system 620 may include interface components, which may provide interfaces to one or more input devices, such as one or more keyboards, mouse devices, touch screens, track pads, trackballs, scroll wheels, digital cameras, microphones, sensors, and the like, that enable video conference system 620 to receive data from one or more users.

In exemplary embodiments of the disclosed technology, video conference system 620 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

Figure 7:
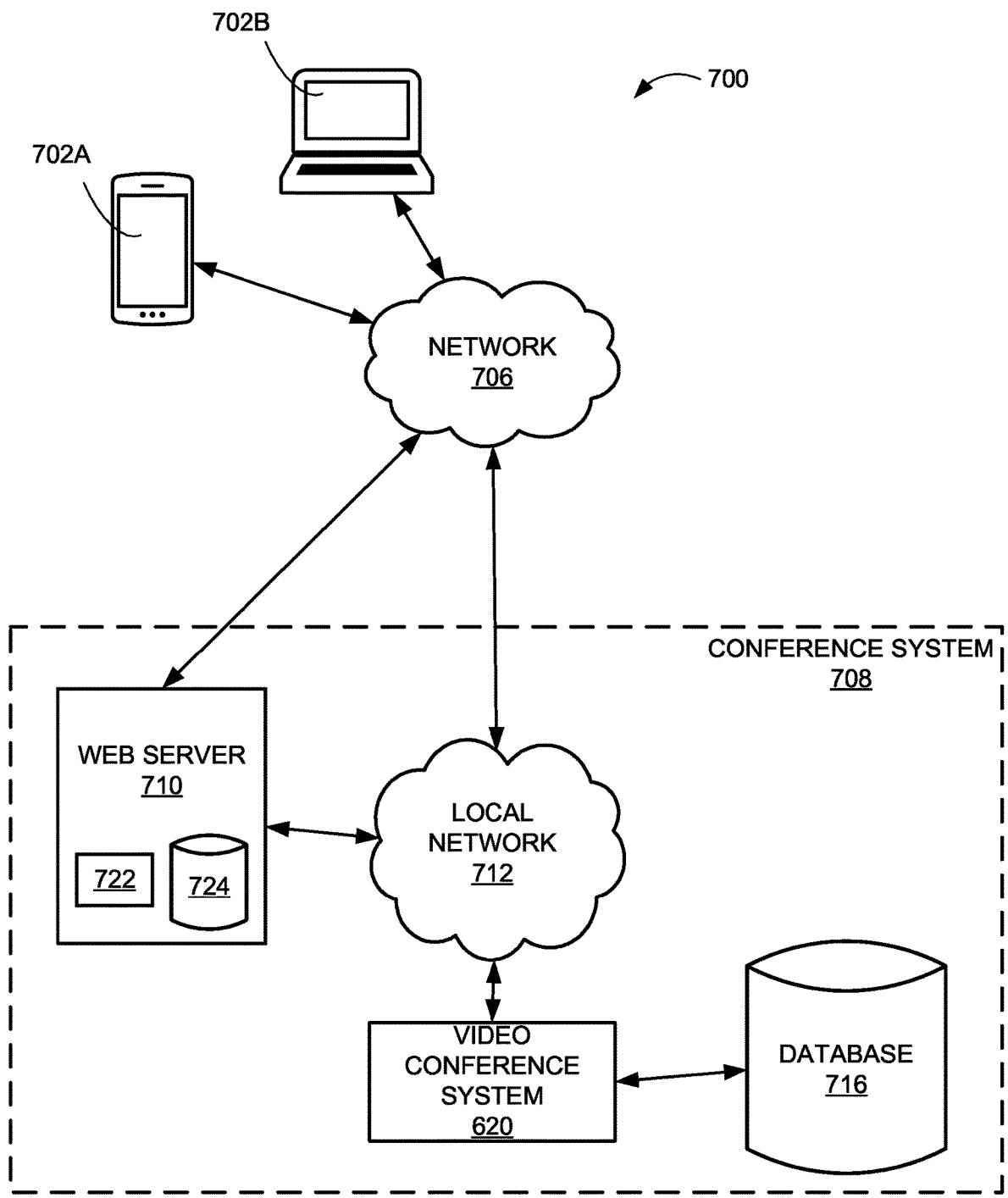
FIG. 7 is a diagram of an exemplary system for conducting a video conference with reduced bandwidth.

FIG. 7 is a diagram of an exemplary system 700 for conducting a video conference with reduced bandwidth. The components and arrangements shown in FIG. 7 are not intended to limit the disclosed embodiments as the components used to implement the disclosed processes and features may vary. As system 700 may include a first user device 702A, a second user device 702B, and a conference system 708 configured to communicate over a network 706. The conference system 708, or one or more components therein, may be configured to interact with the first user device 702A (e.g., transmit encoded facial features of a face of a second person). As shown, the conference system 708 may include, for example, a web server 710, a local network 712, a video conference system 620, and a database 716. Web server 710, first user device 702A, and/or second user device 702B may have a similar structure as shown and described with respect to FIG. 6 and may include many components that are similar to or even have the same capabilities as those described with respect to video conference system 620.

In some embodiments, a first person may operate a first user device 702A and a second person may operate a second user device 702B. Although user device 702A is shown to be a smart phone and user device 702B is shown as a laptop computer, the first user device 702A, the second user device 702B, and any additional (not shown) user device, can each include one or more of a mobile device, smart phone, general purpose computer, tablet computer, laptop computer, telephone, PSTN landline, smart wearable device, other mobile computing device, or any other device capable of communicating with other devices (e.g., including those of conference system 708) via the local network 712, network 506, or both. In some embodiments, the first user device 702A and/or the second user device 702B may include or incorporate electronic communication devices for hearing or vision impaired users. The first user device 702A or the second user device 702B may belong to or be provided by a user, or may be borrowed, rented, or shared. According to some embodiments, the first user device 702A and/or the second user device 702B may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Local network 712 may comprise any type of computer networking arrangement used to exchange data in a localized area, such as WiFi, Bluetooth™, Ethernet, and other suitable network connections that enable user devices (e.g., first user device 702A and/or second user device 702B) to interact with one another and to connect to network 706 for interacting with components in system environment 700. In some embodiments, local network 712 may comprise an interface for communicating with or linking to network 706. In some embodiments, local network 712 may include a home network, such as a LAN or WLAN set up in a user's house. In some embodiments, local network 712 may be commonly used network of a local business, such as, for example, a Wi-Fi network at a particular coffee shop.

Network 706 may be of any suitable type, including individual connections via the internet such as cellular or WiFi networks. In some embodiments, network 506 may connect terminals, services, and mobile devices including by using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 706 may comprise any type of computer networking arrangement used to exchange data. For example, network 706 may be the Internet, a private data network, virtual private network using a public network, and/or other suitable connection(s) that enables components in system environment 700 to send and receive information between the components of system 700. Network 706 may also include a public switched telephone network ("PSTN") and/or a wireless network.

Conference system 708 may be associated with an entity such as a business, corporation, individual, partnership, or any other group that provides one or more of goods, services, and consultations to individuals who are or potentially are consumers of those goods, services, and consultations.

Conference system 708 may include one or more servers, devices, and computer systems for performing one or more functions associated with products and/or services that the entity associated with the conference system 708 provides. Such servers, devices, and computer systems may include, for example, web server 710 and video conference system 620, as well as any other computer systems necessary to accomplish tasks associated with conference system 708.

Web server 710 may include a computer system configured to generate and provide one or more websites accessible to customers and user, as well as any other individuals involved in conference system 708's normal operations. Web server 710 may include a computer system configured to receive communications from the first user device 702A and/or the second user device 702B via for example, a mobile application, a chat program, an instant messaging program, a voice-to-text program, an SMS message, email, or any other type or format of written or electronic communication. Web server 710 may have one or more processors 722 and one or more web server databases 724, which may be any suitable repository of website data. Information stored in web server 710 may be accessed (e.g., retrieved, updated, and added to) via local network 712 and/or network 706 by one or more devices or systems (e.g., video conference system 620) of system 700. In some embodiments, web server 710 may host websites or applications that may be accessed by the first user device 702A and/or the second user device 702B. According to some embodiments, web server 710 may include software tools, similar to those described with respect to first user device 702A and/or second user device 702B above, that may allow web server 710 to obtain network identification data from the first user device 702A or the second user device 702B.

Local networks 712 may comprise any type of computer networking arrangement used to exchange data in a localized area, such as WiFi, Bluetooth™, Ethernet, and other suitable network connections that enable components of conference system 708 to interact with one another and to connect to network 706 for interacting with components in system environment 700. In some embodiments, local network 712 may comprise an interface for communicating with or linking to network 706. In other embodiments, components of conference system 708 may communicate via network 706, without a separate local network 712.

Database 716 may be a database associated with conference system 708 and may store a variety of information relating to users (e.g., facial expressions, representations (models) of faces corresponding to users), transactions, user credentials (e.g., usernames and passwords), customer networks and devices, and business operations. Database 716 may also serve as a back-up storage device and may contain data and information that is also stored on, for example, local databases associated with web server 710, video conference system 620. Database 716 may be accessed by other devices or systems (e.g., video conference system 620) and may be used to store records of every interaction, communication, and/or transaction a particular user has had with access system 708.

While web server 710, first user device 702A, second user device 702B, and video conference system 620 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the web server 710, first user device 702A, second user device 702B, and video conference system 620 may include a greater or lesser number of components than those illustrated.

Although the preceding description describes various functions of the first user device 702A, the second user device 702B, web server 710, database 716, and authentication system 720, in some embodiments, some or all of these functions may be carried out by a single computing device.

Exemplary Use Cases

The following exemplary use cases describe examples of a typical flow pattern. They are intended solely for explanatory purposes and not in limitation.

In one exemplary use case, Jane, operating a laptop (e.g., user device 702B), may wish to initiate or schedule a video conference with John operating a smart phone (e.g., user device 702A), but understands that she has a limited bandwidth allowance (e.g., 500 megabytes (MB) per day) due to having a satellite internet provider. Rather than choosing a typical video conference system, Jane chooses to use a new video conference system (e.g., conference system 708), described and claimed in this application, that transmits and receives captured facial expressions (e.g., action units (e.g., AU 1A) defined by Facial Action Coding System (FACS)), of the speaker/presenter rather than full videos of speaker/presenter or the other participants to reduce bandwidth requirements of end users.

Prior to scheduling a video conference with this new video conference system (e.g., conference system 708), Jane must register and create an account by providing the new video conference system (e.g., conference system 708) with a video showing her face. This video could be recorded as a selfie video with a facing camera on her laptop or smart phone or could be a series of photos of Jane's face stitched together to create a video. Once the new video conference system (e.g., conference system 708) receives a video including Jane's face, either from Jane's laptop or a server (e.g., a cloud server) storing the video of Jane's face, the new video conference system (e.g., conference system 708) generates a representation (e.g., a 3D representation) or model of Jane's face by analyzing the video with a trained neural network (e.g., a variational autoencoder). Once the representation of Jane's face is generated, the new video conference system (e.g., conference system 708) stores it in one or more databases (e.g., database 716 and/or database 660) for later use. To complete her account registration, Jane must also provide her name and email to the new video conference system (e.g., conference system 708) so that they are associated and stored with the representation of Jane's face and that they can be used in a video conference to identify her as a speaker or participant.

Now that Jane has an account registered with the new video conference system (e.g., conference system 708) and the new video conference system has a representation of Jane's face, Jane can set up or schedule a video conference. Jane may request that the new video conference system (conference system 708) set up or schedule a video conference between John and herself by identifying John's email in her request. Once the new video conference system (conference system 708) receives Jane's request to set up or schedule a video conference, it may initiate the video conference immediately or at the scheduled date and time. Once the video conference is initiated, the new video conference system (conference system 708) may retrieve Jane's representation of her face and John's representation of his face from one or more databases (e.g., database 716 and/or database 660) and transmit the representation of Jane's face to John's smartphone (e.g., 702A) once John enters (e.g., clicks a hyperlink generated by the new video conference system) the video conference and the representation of John's face to Jane's laptop (e.g., user device 702B) once she enters the conference. Once at least one party (e.g., Jane, John, or both) has entered the initiated video conference with their respective user devices 702A, 702B (e.g., Jane's laptop and John's smart phone), the new video conference system (e.g., conference system 708) may (automatically) identify Jane's laptop as the speaker device since the new video conference system (e.g., conference system 708) detects it is receiving audio from Jane's laptop is transmitting sound, but not receiving audio from another device. If the new video conference system (e.g., conference system 708) detects it is receiving audio from both Jane's laptop and John's smart phone, then the new video conference system (e.g., conference system 708) determines which one corresponds to the highest audio level (e.g., loudest) identifies the associated device as the speaker device (e.g., Jane's laptop). In response to identifying the speaker device, the new video conference system (e.g., conference system 708) may (automatically) identify all other non-speaker devices as listening devices, which in this case would be John's smart phone.

In response to identifying Jane's laptop as the speaker device by the new video conference system (e.g., conference system 708), Jane's laptop may receive an indication the it was selected as the speaker device. In response, Jane's laptop (via a wirelessly, wired, or integrated camera) (e.g., user device 702B) may capture a video of Jane's face and isolate Jane's live or real-time facial expressions from the video. Jane's laptop (e.g., user device 702B) may then transmit Jane's live facial expressions to the new video conference system (e.g., conference system 708). Once the new video conference system (e.g., conference system 708) receives the facial expressions from the speaker device (e.g., Jane's laptop), it will encode the facial expressions to generate encoded facial expressions. The new video conference system (e.g., conference system 708) will then transmits the encoded facial expressions to the listening device (e.g., John's smart phone).

The listening device (e.g., John's smart phone) may receive the encoded facial expressions of Jane's face. Once received, the listening device (e.g., John's smart phone) may decode the encoded facial expressions to generate decoded facial expressions. The listening device (e.g., John's smart phone) will then apply the decoded facial expressions of the second face to the representation and apply the decoded facial expressions with the representation of Jane's face his smart phone received upon entering the video conference to generate a modified representation of the second face. Finally, listening device (e.g., John's smart phone) may display the modified representation of the second face.

In another exemplary use case, during the video conference, Jane's laptop may capture and transmit a live video of her face to the new video conference system (e.g., conference system 708) while her laptop is identified as the speaker or presenter device. The new video conference system (e.g., conference system 708) may capture or isolate the facial expressions from the live video it received, encode the facial expressions to generate encoded facial expressions, and transmit the encoded facial expressions to the listening or attendee device (e.g., John's smart phone).

To perform these various exemplary uses cases, in some examples, the system may include one or more processors and a memory in communication with the one or more processors and storing instructions that when executed by the one or more processors, are configured to cause the system to perform steps of a method. The method may include receiving a video comprising a first face of a first person, generating, using a variational auto-encoder, a first 3D representation of the first face by analyzing the video, storing the first 3D representation of the first face in a database, receiving a request to set up a video conference between the first person and a second person, retrieving the first 3D representation of the first face and a second 3D representation of a second face of the second person based on the request to conference, initiating the video conference between a first user device associated with the first person and a second user device associated with the second person, automatically identifying the first user device or the second user device as a speaker device associated with a speaker (wherein the speaker is the first person or the second person), automatically identifying the first user device or the second user device as a listening device, associated with a listener, when not identified as the speaker device (wherein the listener is the first person or the second person), receiving facial expressions of the speaker from the speaker device, encoding the facial expressions of the speaker to generate encoded facial expressions, and transmitting the encoded facial expressions of the speaker to the listening device to be decoded and combined with the first 3D representation of the first face or the second 3D representation of the second face associated with the speaker.

In the method, generating the first 3D representation of the first face may include detecting the first face in at least two frames of the video and identifying points of the first face in the at least two frames.

In the method, the request to set up the video conference may include a list of invitees comprising the second person, a date for the video conference, and a start time for video conference.

In the method, the database may be a remote database.

In the method, automatically identifying the speaker device may be based on receiving a first audio from the first user device or a second audio from the second user device.

In the method, automatically identifying the speaker device may include receiving a first audio from the first user device and a second audio from the second user device, determining which among the first audio and the second audio has a highest audio level, and identifying the first user device as the speaker device when the first audio has the highest audio level or identifying the second user device as the speaker device when the second audio has the highest audio level.

The method may further include transmitting the first 3D representation of the first face to the second user device prior to or along with initiating the video conference.

The method may further include transmitting the second 3D representation of the second face to the first user device prior to or along with initiating the video conference.

In the method, automatically identifying the speaker device, receiving facial expressions of the speaker from the speaker device, encoding the facial expressions of the speaker, and transmitting the encoded facial expressions of the speaker to the listening device occur approximately in real-time.

To perform these various exemplary uses cases, in some examples, the user device may include one or more processors and a memory in communication with the one or more processors and storing instructions that when executed by the one or more processors, are configured to cause the user device to perform steps of a method. The method may include receiving a video including a first face of a first person, generating, using a variational auto-encoder, a first representation of the first face based on the video, storing the first representation of the first face in a database, receiving a request to initiate a video conference between a first user device associated with the first person and a second user device associated with a second person, retrieving, based on the request, the first representation of the first face and a second representation of a second face from the database, initiating the video conference between the first user device and the second user device, selecting the first user device or the second user device as a presenter device associated with a presenter (wherein the presenter is the first person or the second person), selecting the first user device or the second user device as an attendee device associated with an attendee when not identified as the presenter device (wherein the attendee is the first person or the second person), receiving a live video stream of the presenter, identifying and extracting facial expressions of the presenter from the live video stream, encoding the facial expressions of the presenter to generate encoded facial expressions, and transmitting the encoded facial expressions of the presenter to the attendee device to be decoded and combined with the first representation of the first face or the second representation of the second face associated with the presenter device.

In the method, generating the first representation of the first face may include detecting the first face in at least one frame of the video and identifying points of the first face in the at least one frame.

In the method, the request to initiate the video conference may include a list of invitees comprising the second person, a date for the video conference, and a start time for video conference.

In the method, the presenter device includes receiving a first audio from the first user device or a second audio from the second user device.

In the method, identifying the presenter device may include receiving a first audio from the first user device and a second audio from the second user device, determining which among the first audio and the second audio has a highest audio level, and selecting the first user device as the presenter device when the first audio has the highest audio level or selecting the second user device as the presenter device when the second audio has the highest audio level.

The method may further include transmitting the first representation of the first face to the second user device prior to or along with initiating the video conference.

The method may further include transmitting the second representation of the second face to the first user device prior to or along with initiating the video conference.

In the method, automatically selecting the presenter device, receiving facial expressions of the presenter from the presenter device, encoding the facial expressions of the presenter, and transmitting the encoded facial expressions of the presenter to the attendee device occur approximately in real-time.

To perform these various exemplary uses cases, in some examples, the user device may include one or more processors and a memory in communication with the one or more processors and storing instructions that when executed by the one or more processors, are configured to cause the user device to perform steps of a method. The method may include receiving a request to set up a video conference between a first account associated with a first person and a second account associated with a second person, retrieving a stored first representation of a first face of the first person and a stored second representation of a second face of the second person based on the request, initiating the video conference between a first user device associated with the first person and a second user device associated with the second person, receiving facial expressions of the first person from the first user device, encoding the facial expressions of the first person to generate first encoded facial expressions; and transmitting the first encoded facial expressions of the first person to the second user device to be decoded and combined with the stored first representation of the first face.

The method may also include transmitting the stored first representation of the first face to the second user device prior to or along with initiating the video conference and transmitting the stored second representation of the second face to the first user device prior to or along with initiating the video conference The method may also include receiving facial expressions of the second person from the second user device, encoding the facial expressions of the second person to generate second encoded facial expressions, and transmitting the second encoded facial expressions of the second person to the first user device to be decoded and combined with the stored second representation of the second face.

The features and other aspects and principles of the disclosed embodiments may be implemented in various embodiments and environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors; and
   a memory in communication with the one or more processors and storing instructions that, when executed by the one or more processors, are configured to cause the system to:
   receive a first bandwidth indication from a first user device;
   determine that the first bandwidth indication is below a predetermined threshold;
   responsive to determining that the first bandwidth indication is below the predetermined threshold, transmit a facial expression request to a second user device;
   responsive to the facial expression request:
   request encoded facial expressions of a second user associated with the second user device; and
   receive the encoded facial expressions of the second user associated with the second user device; and
   transmit the encoded facial expressions of the second user to the first user device.

2. The system of claim 1, wherein the memory stores further instructions that, when executed by the one or more processors, are further configured to cause the system to responsive to determining that the first bandwidth indication is not below the predetermined threshold, transmit a request for video from the second user device instead of the facial expression request.

3. The system of claim 1, wherein the memory stores further instructions that, when executed by the one or more processors, are further configured to cause the system to:
   receive a video comprising a first face of a first user;
   generate, using a variational auto-encoder, a first 3D representation of the first face by analyzing the video;
   store the first 3D representation of the first face in a database;
   receive a request to set up a video conference between the first user and a second user;
   retrieve the first 3D representation of the first face and a second 3D representation of a second face of the second user based on the request to conference; and
   initiate the video conference between the first user device associated with the first user and the second user device associated with the second user;
   wherein the request to set up the video conference comprises a list of invitees comprising the second user, a date for the video conference, and a start time for video conference.

4. The system of claim 3, wherein the database is a remote database.

5. The system of claim 3, wherein the memory stores further instructions that, when executed by the one or more processors, are further configured to cause the system to:
   automatically identify the first user device or the second user device as a speaker device associated with a speaker, wherein the speaker is the first user or the second user; and
   automatically identify the first user device or the second user device as a listening device, associated with a listener, when not identified as the speaker device, wherein the listener is the first user or the second user,
   wherein automatically identifying the speaker device is based on receiving a first audio from the first user device or a second audio from the second user device.

6. The system of claim 5, wherein automatically identifying the speaker device comprises:
receiving a first audio from the first user device and a second audio from the second user device;
determining which among the first audio and the second audio has a highest audio level; and
identifying the first user device as the speaker device when the first audio has the highest audio level or identifying the second user device as the speaker device when the second audio has the highest audio level.

7. The system of claim 5, wherein automatically identifying the speaker device, receiving facial expressions of the speaker from the speaker device, encoding the facial expressions of the speaker, and transmitting the encoded facial expressions of the speaker to the listening device occur approximately in real-time.

8. The system of claim 3, wherein the memory stores further instructions that, when executed by the one or more processors, are further configured to cause the system to transmit the first 3D representation of the first face to the second user device prior to or along with initiating the video conference.

9. The system of claim 8, wherein the memory stores further instructions that, when executed by the one or more processors, are further configured to cause the system to transmit the second 3D representation of the second face to the first user device prior to or along with initiating the video conference.

10. A system comprising:
one or more processors; and
a memory in communication with the one or more processors and storing instructions that, when executed by the one or more processors, are configured to cause the system to:
receive a live video stream from a first user device;
receive a first bandwidth indication from the first user device;
determine that the first bandwidth indication is below a predetermined threshold;
responsive to determining that the first bandwidth indication is below the predetermined threshold:
identify and extract facial expressions of a first user associated with the first user device from the live video stream; and
transmit a facial expression request to a second user device;
request first encoded facial expressions of a second user associated with the second user device in response to the facial expression request;
encode the facial expressions of the first user to generate second encoded facial expressions; and
transmit the second encoded facial expressions of the first user to the second user device.

11. The system of claim 10, wherein the memory stores further instructions that, when executed by the one or more processors, are further configured to cause the system to:
receive a video comprising a first face of a first user;
generate, using a variational auto-encoder, a first representation of the first face based on the video;
store the first representation of the first face in a database;
receive a request to initiate a video conference between the first user device associated with the first user and the second user device associated with a second user;
retrieve, based on the request, the first representation of the first face and a second representation of a second face from the database;
initiate the video conference between the first user device and the second user device;
select the first user device or the second user device as a presenter device associated with a presenter, wherein the presenter is the first user or the second user; and
select the first user device or the second user device as an attendee device associated with an attendee when not identified as the presenter device, wherein the attendee is the first user or the second user,
wherein generating the first representation of the first face comprises detecting the first face in at least one frame of the video and identifying points of the first face in the at least one frame.

12. The system of claim 11, wherein the request to initiate the video conference comprises a list of invitees comprising the second user, a date for the video conference, and a start time for video conference.

13. The system of claim 11, wherein identifying the presenter device comprises receiving a first audio from the first user device or a second audio from the second user device.

14. The system of claim 11, wherein identifying the presenter device comprises receiving a first audio from the first user device and a second audio from the second user device, determining which among the first audio and the second audio has a highest audio level, and selecting the first user device as the presenter device when the first audio has the highest audio level or selecting the second user device as the presenter device when the second audio has the highest audio level.

15. The system of claim 11, wherein the memory stores further instructions that, when executed by the one or more processors, are further configured to cause the system to transmit the first representation of the first face to the second user device prior to or along with initiating the video conference.

16. The system of claim 15, wherein the memory stores further instructions that, when executed by the one or more processors, are further configured to cause the system to transmit the second representation of the second face to the first user device prior to or along with initiating the video conference.

17. The system of claim 11, wherein automatically selecting the presenter device, receiving facial expressions of the presenter from the presenter device, encoding the facial expressions of the presenter, and transmitting the encoded facial expressions of the presenter to the attendee device occur approximately in real-time.

18. A system comprising:
one or more processors; and
a memory in communication with the one or more processors and storing instructions that, when executed by the one or more processors, are configured to cause the system to:
receive a first bandwidth indication from a first user device;
determine that the first bandwidth indication is below a predetermined threshold;
responsive to determining that the first bandwidth indication is below the predetermined threshold:
transmit a first facial expression request to the first user device; and
transmit a second facial expression request to a second user device;
receive first encoded facial expressions of a first person from the first user device in response to the first facial expression request;

request second encoded facial expressions of a second person from the second user device in response to the second facial expression request; and transmit the first encoded facial expressions of the first person to the second user device to be decoded and combined with a stored first representation of a first face.

19. The system of claim 18, wherein the memory stores further instructions that, when executed by the one or more processors, are further configured to cause the system to:

receive a request to set up a video conference between a first account associated with the first person and a second account associated with a second person;

retrieve a stored first representation of a first face of the first person and a stored second representation of a second face of the second person based on the request;

initiate the video conference between a first user device associated with the first person and a second user device associated with the second person; and transmit the stored first representation of the first face to the second user device prior to or along with initiating the video conference and transmit the stored second representation of the second face to the first user device prior to or along with initiating the video conference.

20. The system of claim 19, wherein the memory stores further instructions that, when executed by the one or more processors, are further configured to cause the system to:

responsive to determining that the first bandwidth indication is below the predetermined threshold, transmit a second facial expression request to the second user device;

receive second encoded facial expressions of the second person from the second user device in response to the second facial expression request; and transmit the second encoded facial expressions of the second person to the first user device to be decoded and combined with the stored second representation of the second face.

* * * * *